Sept. 21, 1926.
C. Q. PAYNE
1,600,961
MEANS FOR REDUCING THE SLIDING FRICTION OF CONTACT MEMBERS
Filed April 27, 1926
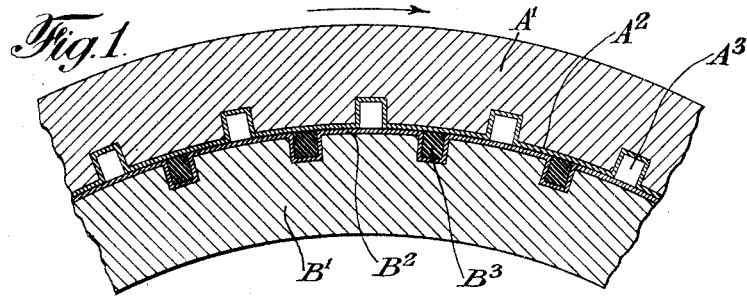
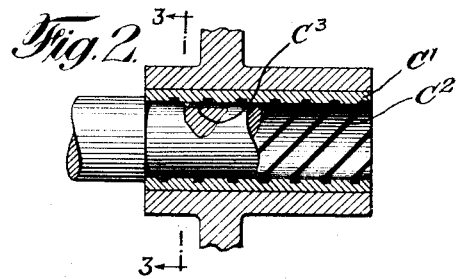
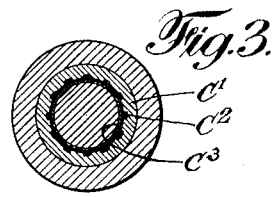
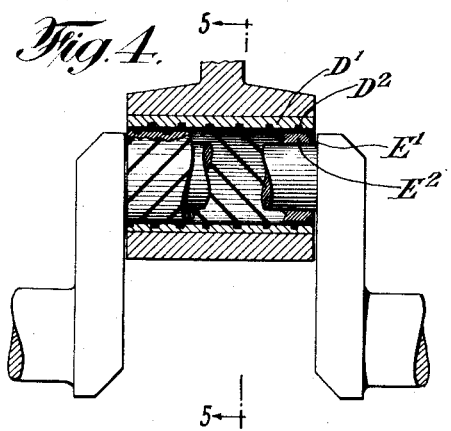
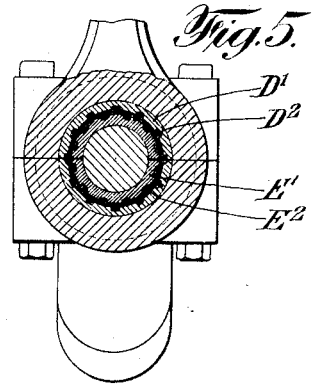
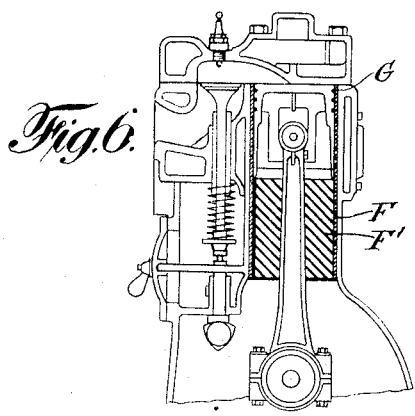
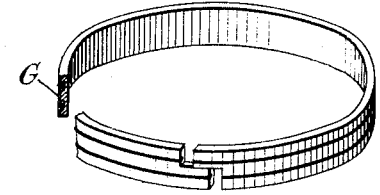
Inventor
CLARENCE Q. PAYNE
By his Attorneys.

Patented Sept. 21, 1926.

1,600,961

UNITED STATES PATENT OFFICE.

CLARENCE Q. PAYNE, OF NEW YORK, N. Y.

MEANS FOR REDUCING THE SLIDING FRICTION OF CONTACT MEMBERS.

Application filed April 27, 1926. Serial No. 104,957.

My invention relates broadly to improvements in metal compounds or aggregates, other than alloys, which are designed to reduce the friction of surfaces moving in contact with each other, such as shaft bearings, cylinders provided with reciprocating pistons, wrist pins, shackles, oscillating members, etc.

It consists essentially of a novel combination or aggregate of metals and lubricating material so associated that it shall not only have a very low coefficient of friction, but also great durability and one which can be adapted to different application.

It also consists of a special combination of metals whereby a thin layer of an extremely hard metal or alloy is applied electrolytically to the surface of a supporting wall subjected to rotating or sliding friction, whereby said wall may be made of very light metal or alloy and protected against corrosion as well as abrasion.

It also consists of a method of reducing sliding friction whereby the bearing is flexibly supported between inside and outside antifriction wall bodies whose pressure supporting areas are of the same order of hardness.

In the accompanying drawings, Fig. 1 shows in sectional view two antifriction linings on a greatly enlarged scale to show their construction.

Figs. 2 and 3 show antifriction linings applied to a shaft bearing.

Figs. 4 and 5 show antifriction linings applied to a crank shaft bearing.

Fig. 6 shows a sectional view of a single cylinder of an internal combustion engine in which the antifriction material is applied to the inside wall of the cylinder in the form of a bushing.

Fig. 7 shows a similar application to a piston ring of said engine.

It is well known that no single homogeneous metal, no matter how hard it may be, gives satisfactory service as a wear-resisting medium in supporting bearing pressure. Bearing metals are therefore usually made of alloys of two or more metals so combined that they are composed of relatively hard and soft microscopic particles intimately mixed. The function of the hard particles is to support the load and resist wear when metallic contact exists between the bearing surfaces, and the function of the softer particles is to wear down slightly below the level of the harder so as to form slight depressions on the apparently smooth wearing surface in which some of the lubricant is held when the bearing surfaces are brought into contact with each other. A characteristic bearing alloy is bronze, made of copper and tin so proportioned and combined that the dissimilarity of the constituent crystal permits the functions described above to be exercised.

A perfect bearing alloy is however somewhat difficult to produce. The dissimilarity of the constituent crystals is largely dependent upon the care and skill used in making up the alloy and in securing the proper chill effect. Tin has a strong tendency to oxidize, and the oxides, both of copper and of tin, dissolve in the alloy whereby its strength and density is reduced. The absorption of oxygen and the tendency of bronzes to liquate, as well as high smelting losses, all add to the metallurgical difficulties involved.

My invention avoids these difficulties. Broadly, it comprises wear-resisting surfaces on both sides of the plane of contact of members in sliding engagement. These surfaces are provided with pressure supporting areas formed of an extremely hard metal, which are alternated in the case of one or both of said surfaces with areas of very soft material affording means for lubrication. Where lubrication is thus provided, the alternating hard and soft areas preferably form parts of a lining or backing of softer metal than that of the wear-resisting areas, in order to give the latter a desired plasticity or ability to mold itself to conform to the shape of the other member which exerts pressure upon it. This plastic wall body or bushing should have sufficient compressive strength so as not to be squeezed out of place or crack when subjected to sudden shocks. This is shown on an enlarged scale at A' and B' in Fig. 1, also at C' in Figs. 2 and 3, and at D' and E' in Figs. 4 and 5. It may be any convenient cast or drawn metal such as iron, copper, brass, aluminum, etc. It supplies the softer and more resilient element of the bearing metal aggregate and in it are cut the grooves shown at $A^3$, and $B^3$, in Fig. 1, at $C^2$ in Figs. 2 and 3, and at $D^2$ and $E^2$ in Figs. 4 and 5. These grooves may be slightly undercut to hold the solid lubricant in place. They may be placed at any convenient angle with the axis of the bearing and preferably in the form of a helix. In those cases where the antifriction bearing is preferably self-contained, the lubricant may be graphite or a similar solid material imbedded in the grooves. The grooved depressions then form reservoirs for the lubricating material whose function is not only to fill the pores and depressions of the surfaces in contact as well as the clearance between the surfaces with fine particles of lubricant, but also to collect and hold any fine gritty particles finding their way into the bearing and thus to prevent lapping of the surfaces and consequent wear. In certain cases where oil is used as the lubricating material. It may be allowed to circulate through the open grooves from a separate source of supply.

The grooves not only provide means for supplying lubrication to the load bearing surfaces, but by subdividing the latter, they afford also flexibility and adjustment in distributing the load over the entire surface of the journal under flexure. They thus perform a double function.

In cooperation with the metal backing and its lubricating grooves, my invention provides for a supplementary metal in the antifriction aggregate, whose principal function is to support the load and resist wear of the surfaces in contact. The harder the metals in contact, the less is the friction, and also the wear when, as herein provided, there is a sufficient plasticity or yielding support to prevent the concentration of the load upon a few high spots, which would cause abnormal pressure per square inch on such areas, and therefore heating and abrasion. This supplementary metal is shown at $A^2$ and $B^2$, Fig. 1. It is, preferably applied electrolytically in the form of a layer of metal deposited over the prepared bearing surface.

Metals deposited by electrolysis are somewhat harder than in their fused forms, and the supplementary hard metal or metallic compound may be brass, iron, cobalt, or chromium, in the scale of increasing hardness. It may also be one of those rarer but still harder metals such as tungsten, tantalum, etc. The combination of metals which form the antifriction aggregate, namely that of the supporting and plastic cylinder, and the supplementary hard metal whose function is to support the load, thus covers a range of choice, which is dependent upon the nature of the service required. Chromium is at present the most available hard metal as it has a microhardness, measured by the scratch test, of about eight times that of bronze.

It has heretofore been assumed that the best means of reducing the friction of members in sliding engagement is to make the contact surface of one of said members of a material such as bronze, much softer than that of the other member, such as steel. I have found, however, by trial that a much lower coefficient of friction than with steel on bronze, can be obtained when both contact surfaces are made of approximately the same order of hardness as chromium, provided one or both of the surfaces are rendered plastic to the bearing pressure as by the use of a plastic supporting metal, in combination with means for lubrication. In this way under normal loads, the surfaces give long wear by simply polishing each other without abrasion. An approximate scale of microhardness as measured by the scratch test of the principal metals and alloys is as follows:

| | |
|---|---:|
| Chromium | 2000 |
| Case hardened steel | 1950 |
| Steel shafting | 750 |
| Swedish iron | 408 |
| Cobalt | 625 |
| Bronze | 244 |
| Babbitt | 208 |
| Copper | 78 |

From this it will be seen that carburized or case-hardened steel is quite approximately of the same order of hardness as chromium, whereas none of the other metals or alloys are of the same order of hardness.

Fig. 6 shows a cross-section through the cylinder of an internal combustion engine. The antifriction lining of chromium may be applied directly to the walls of the cylinder, or preferably as shown in the drawing, by means of a sleeve or bushing, F.

It is also within the scope of my invention to apply the hard metal layer (chromium, etc) directly to the surface of the journal as shown at $C^3 C^3$, Figs. 2 and 3, in those cases where sufficient plasticity and lubrication may be supplied by a single lining or bushing, C', and which is provided with a metal of the same order of hardness as that applied to the journal. In the same way when the antifriction lining is applied to the wall of an internal combustion engine the hard metal (chromium, etc.) may also be added to the surface of the piston rings, as shown at F, Fig. 6, in order that the metal surfaces F and G brought into sliding contact shall likewise be of the same order of hardness.

It will be understood that the two bearing surfaces need not be of the same material provided they are of substantially the same order of hardness, and that one member of the bearing may be of case hardened steel, and the other of chromium, within the spirit of my invention.

While I have illustrated and described several embodiments of my invention it is to be understood that various modifications may be made therein without departing from the spirit of the invention or the scope of the appended claims.

I claim:

1. An anti-friction bearing, comprising relatively movable contacting metallic bearing surfaces of substantially the same hardness as chromium, and a relatively plastic metal supporting and backing layer of a lower degree of hardness, supporting one of said bearing surfaces, so as to permit adjustment of said bearing surface under pressure.

2. An anti-friction bearing, comprising relatively movable contacting metallic bearing surfaces of substantially the same hardness as chromium, and a relatively plastic metal supporting and backing layer of a lower degree of hardness, supporting one of said bearing surfaces, so as to permit adjustment of said bearing surface under pressure, said bearing surfaces having grooves therein containing an anti-friction material in solid form.

3. An anti-friction bearing comprising relatively movable contacting metallic bearing members having the bearing surfaces thereof composed of a thin layer of chromium supported on a backing metal of a lower degree of hardness adapted to yieldingly support said layer.

4. In a bearing of the type described, a stationary bearing member, having a bearing surface of chromium supported on a relatively plastic metal backing, and a movable bearing member, having a bearing surface of substantially the same order of hardness as chromium, cooperating with said stationary bearing.

In testimony whereof I have affixed my signature to this specification.

CLARENCE Q. PAYNE.